United States Patent
Busaji et al.

(10) Patent No.: US 12,441,473 B2
(45) Date of Patent: Oct. 14, 2025

(54) SYSTEM INCLUDING STOWABLE CUPHOLDER APPARATUS

(71) Applicant: B/E Aerospace, Inc., Winston-Salem, NC (US)

(72) Inventors: Praveen K. Busaji, Hyderabad (IN); Sambasiva Rao Kodati, Vinjaram (IN); Chandra Sekhar Gudla, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 195 days.

(21) Appl. No.: 18/211,830

(22) Filed: Jun. 20, 2023

(65) Prior Publication Data
US 2024/0076042 A1 Mar. 7, 2024

(30) Foreign Application Priority Data
Sep. 7, 2022 (IN) .............................. 202241051084

(51) Int. Cl.
*B64D 11/06* (2006.01)
(52) U.S. Cl.
CPC ................................ *B64D 11/0638* (2014.12)
(58) Field of Classification Search
CPC .................................................. B64D 11/0638
USPC .......................... 297/188.07, 147; 108/25, 26
See application file for complete search history.

(56) References Cited

U.S. PATENT DOCUMENTS

| | | | |
|---|---|---|---|
| 3,667,079 A * | 6/1972 | Hagglund | A61C 19/00 433/25 |
| 3,817,190 A | 6/1974 | Evangelista | |
| 4,733,908 A | 3/1988 | Dykstra et al. | |
| 5,785,290 A * | 7/1998 | Harris | A47B 13/16 248/205.2 |
| 6,279,992 B1 * | 8/2001 | Plocher | B60N 3/102 297/146 |

(Continued)

FOREIGN PATENT DOCUMENTS

| | | |
|---|---|---|
| EP | 2603399 B1 | 7/2017 |
| GB | 2356801 A | 6/2001 |

(Continued)

OTHER PUBLICATIONS

Extended European Search Report dated Oct. 26, 2023; European Application No. 23195071.8.

*Primary Examiner* — Jose V Chen
(74) *Attorney, Agent, or Firm* — Suiter Swantz IP

(57) ABSTRACT

A system includes a stowable cupholder apparatus. The stowable cupholder apparatus includes a cupholder member defined by: a top planar member, the top planar member having a cup hole configured to accommodate a cup; a rear planar member extending from the top planar member; and a base planar member extending from the rear planar member, wherein a gap exists between the top planar member and the base planar member. The stowable cupholder apparatus may include a cup grip ring member attached to the top planar member, the cup grip ring member including a ring and cup grip fingers extending inwardly away from the ring. The stowable cupholder apparatus may include a hinge attached to the rear planar member and configured to attach to a structure, wherein the hinge has a range of motion configured to move the cupholder member between a stowed position and a deployed position.

20 Claims, 8 Drawing Sheets

(56) References Cited

U.S. PATENT DOCUMENTS

| | | | |
|---|---|---|---|
| 6,283,042 B1 * | 9/2001 | Wargo | A47D 15/00 108/26 |
| 6,298,793 B1 * | 10/2001 | Turner | A47D 15/00 108/26 |
| 6,409,137 B1 | 6/2002 | Tran | |
| 8,176,855 B1 * | 5/2012 | Cannon | A47B 13/16 229/117.08 |
| 8,336,956 B2 * | 12/2012 | Westerink | B64D 11/0638 297/145 |
| 8,360,441 B2 * | 1/2013 | Caruso | B62B 3/1472 108/26 |
| 8,881,659 B2 | 11/2014 | Ackeret et al. | |
| 9,032,882 B1 * | 5/2015 | Richardson | B65F 1/02 15/257.1 |
| 9,408,456 B2 | 8/2016 | Hart | |
| 10,293,756 B1 * | 5/2019 | Kollias | B64D 11/00 |
| 10,843,613 B2 | 11/2020 | Smith et al. | |
| 10,981,654 B2 | 4/2021 | Slack, Jr. | |
| 11,046,229 B1 * | 6/2021 | Natwick | B60N 3/106 |
| 11,186,373 B1 * | 11/2021 | Elliott | B64D 11/0638 |
| 2013/0062382 A1 * | 3/2013 | Alford | B64D 11/00 224/482 |
| 2014/0034697 A1 | 2/2014 | Mak et al. | |
| 2014/0360410 A1 * | 12/2014 | Robinson | A47G 23/06 108/26 |
| 2016/0152169 A1 * | 6/2016 | Zheng | B60R 7/005 297/163 |
| 2019/0152373 A1 * | 5/2019 | Hirano | B60N 3/004 |
| 2019/0283644 A1 * | 9/2019 | Smith | B60N 3/102 |
| 2021/0347486 A1 * | 11/2021 | Arroum | B60N 3/004 |
| 2023/0415629 A1 * | 12/2023 | Tuico | A47C 7/622 |

FOREIGN PATENT DOCUMENTS

| | | |
|---|---|---|
| GB | 2514674 A | 12/2014 |
| KR | 20190109101 A | 9/2019 |

* cited by examiner

SYSTEM INCLUDING STOWABLE CUPHOLDER APPARATUS

CROSS-REFERENCE TO RELATED APPLICATIONS

The present application is related to and claims priority from: Indian Application Serial Number 202241051084, titled SYSTEM INCLUDING STOWABLE CUPHOLDER APPARATUS, filed Sep. 7, 2022. Indian Application Serial Number 202241051084 is herein incorporated by reference in its entirety.

BACKGROUND

Currently, for many airline passengers, the only cupholder available is a cup recess on their meal tray. Drinks are frequently spilled while the meal tray is in use because drinks can be easily bumped out of the meal tray cup recess. Additionally, the cup recess takes up valuable surface area on the meal tray.

SUMMARY

In one aspect, embodiments of the inventive concepts disclosed herein are directed to a system. The system includes a stowable cupholder apparatus. The stowable cupholder apparatus includes a cupholder member defined by: a top planar member, the top planar member having a cup hole configured to accommodate a cup; a rear planar member extending from the top planar member; and a base planar member extending from the rear planar member, wherein a gap exists between the top planar member and the base planar member. The stowable cupholder apparatus may include a cup grip ring member attached to the top planar member, the cup grip ring member including a ring and cup grip fingers extending inwardly away from the ring. The stowable cupholder apparatus may include a hinge attached to the rear planar member and configured to attach to a structure, wherein the hinge has a range of motion configured to move the cupholder member between a stowed position and a deployed position.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
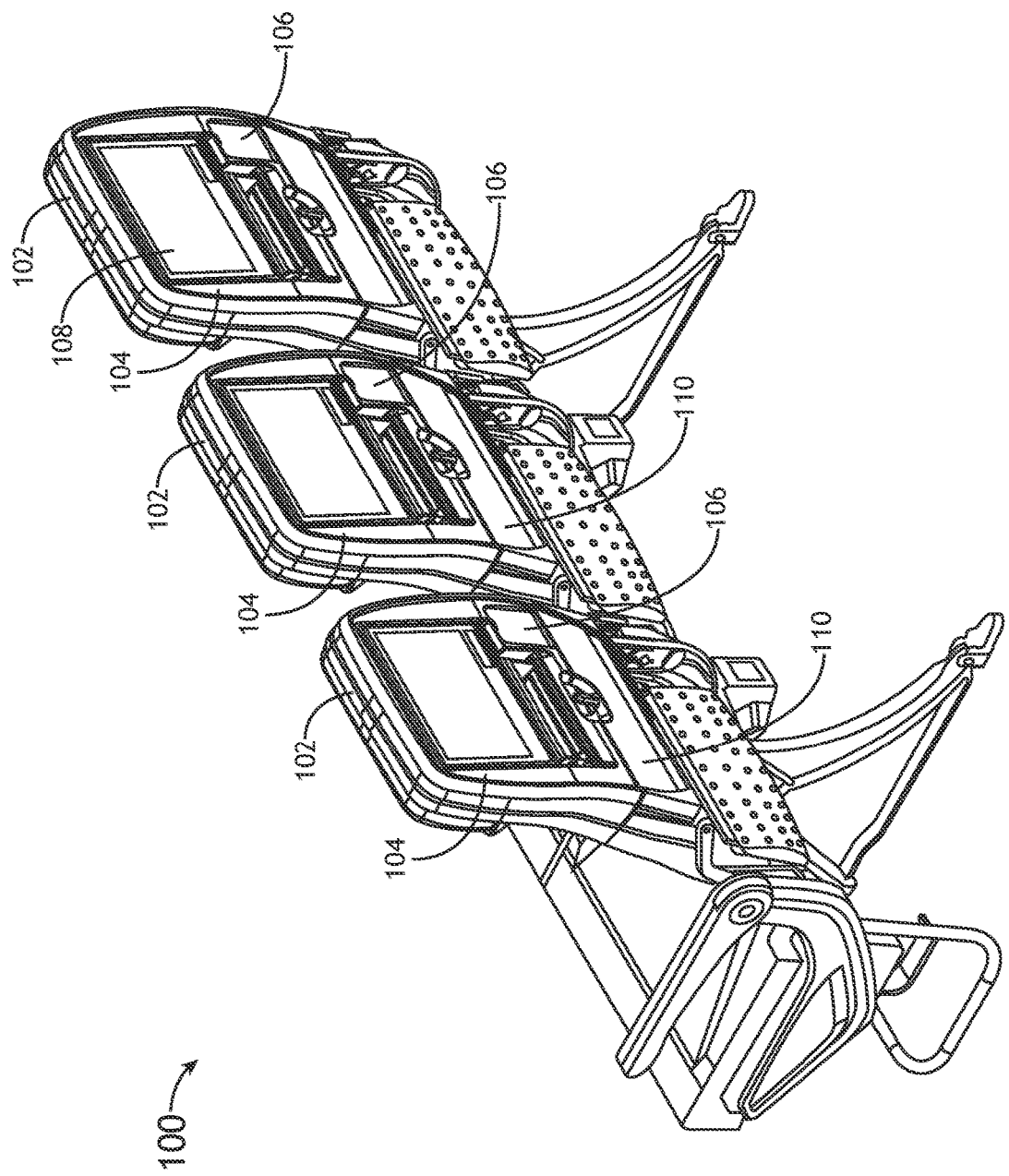
FIG. 1 is a view of an exemplary embodiment of a system including a seat having a stowable cupholder apparatus according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a stowable cupholder apparatus. The system may be a non-vehicular system or may include a vehicle (e.g., aircraft, watercraft, automobile, train, etc.). The stowable cupholder apparatus may be used in any suitable environment.

In some embodiments, a stowable cupholder apparatus may be used installed on a vehicle seatback (e.g., an aircraft seatback). For example, the stowable cupholder apparatus may be installed below a display and above the meal tray; however, the stowable cupholder apparatus may be installed on any suitable location of the seatback. In some embodiments, the stowable cupholder apparatus may hold any size cup or drink. The stowable cupholder apparatus may avoid spillage by providing additional support. In some embodiments, the stowable cupholder apparatus may be used as an apparel holder (e.g., a coat hook), a mobile electronic device holder (e.g., a mobile phone holder or a tablet device holder), or as stowage for an item (e.g., a wallet and/or a passport). In some embodiments, passengers can utilize the stowable cupholder apparatus with any of various suitable sizes of drinks to avoid spillage during flight. Additionally, the passenger may place their mobile phone and hang their coat on the stowable cupholder apparatus, which allows object storage to consume less usable space in the cabin as compared to deploying the meal tray to use a cupholder. In some embodiments, the stowable cupholder apparatus may improve passenger convenience. In some embodiments, the stowable cupholder apparatus may be easy to install, deploy, replace, and/or repair and may be cost effective due to the stowable cupholder apparatus' design with multiple use cases. In some embodiments, the stowable cupholder apparatus may be a motorized stowable cupholder apparatus such that the stowable cupholder apparatus may move between a stowed and deployed position via operation of a motor and/or actuator.

Referring now to FIG. 1, an exemplary embodiment of a system including a vehicle (e.g., aircraft 100, watercraft, automobile, train, etc.) including at least one seat (e.g., an aircraft seat 102) are depicted according to the inventive concepts. For example, the seat 102 may have a seatback 104. The seatback 104 may include a display 108 and a meal tray 110. The system may include at least one stowable cupholder apparatus 106 (e.g., which is shown in a stowed position), which, for example, may be installed on the seatback (e.g., a vehicle seatback (e.g., an aircraft seatback 104)) of the seat (e.g., a vehicle seat (e.g., an aircraft seat 102)) or a monument (e.g., an aircraft monument (e.g., an aircraft galley monument)). The stowable cupholder apparatus 106 may be installed at any suitable location in any suitable vehicle, or in any other suitable environment. In some embodiments, the system may include multiple stowable cupholder apparati 106.

Figure 2:
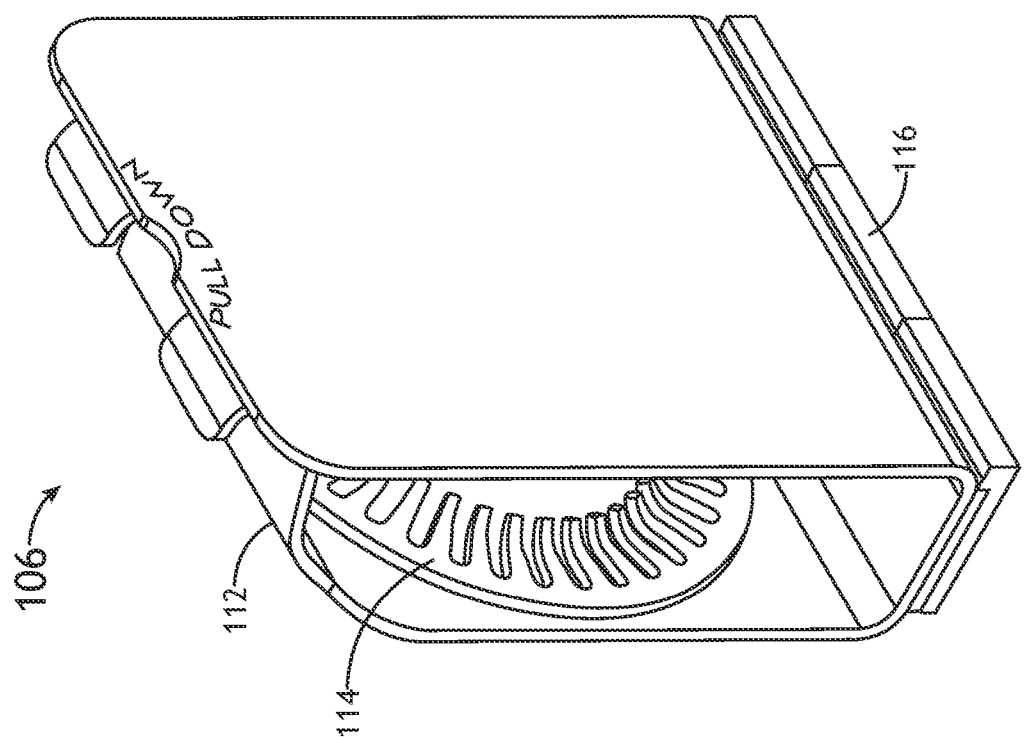
FIG. 2 is a view of the stowable cupholder apparatus of FIG. 1 according to the inventive concepts disclosed herein.

Referring now to FIG. 2, an exemplary embodiment of the stowable cupholder apparatus 106 is shown. The stowable cupholder apparatus 106 may include a cupholder member 112, a cup grip ring member 114, and a hinge 116 (e.g., a piano hinge, which is shown in a stowed position).

Figure 3:
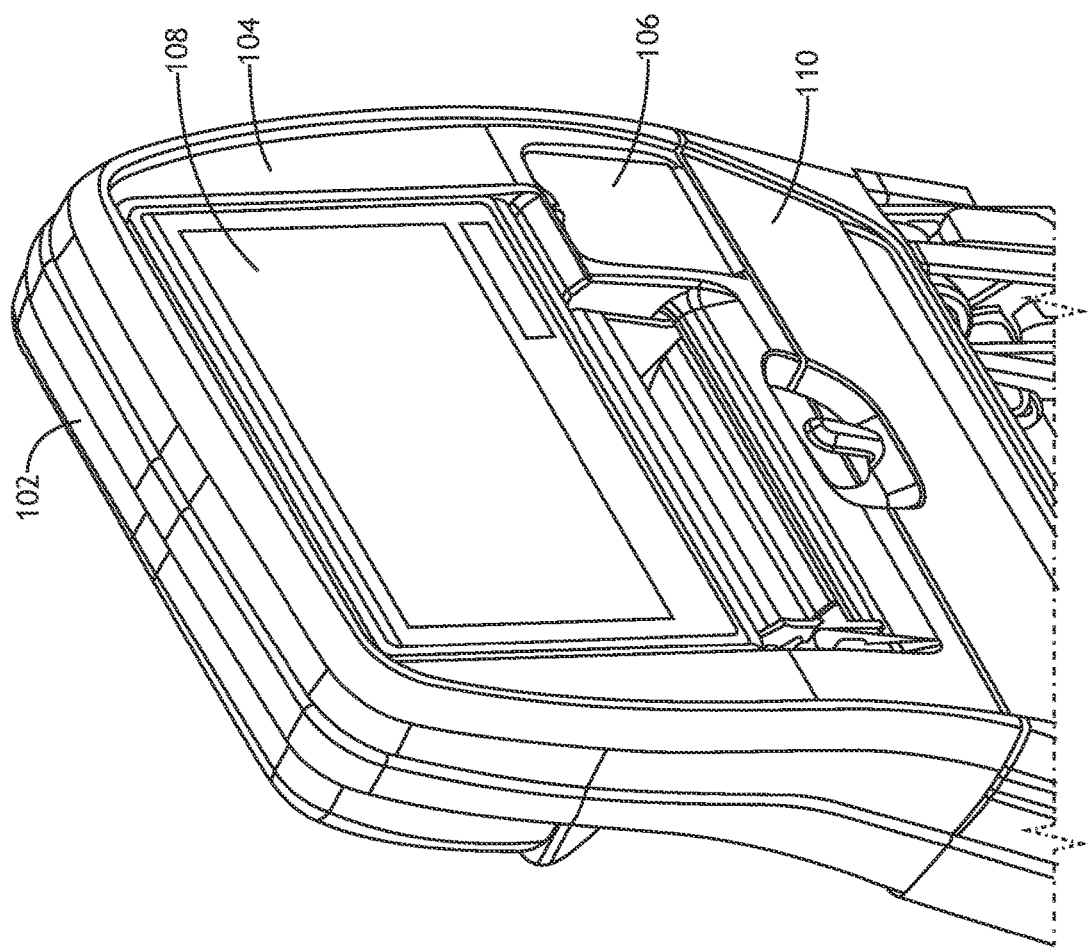
FIG. 3 is a view of an exemplary embodiment of a seat having the stowable cupholder apparatus of FIG. 1 according to the inventive concepts disclosed herein.

Referring now to FIG. 3, an exemplary embodiment of the seatback 104 including the stowable cupholder apparatus 106, with the stowable cupholder apparatus 106 in the stowed position, is shown.

Figure 4:
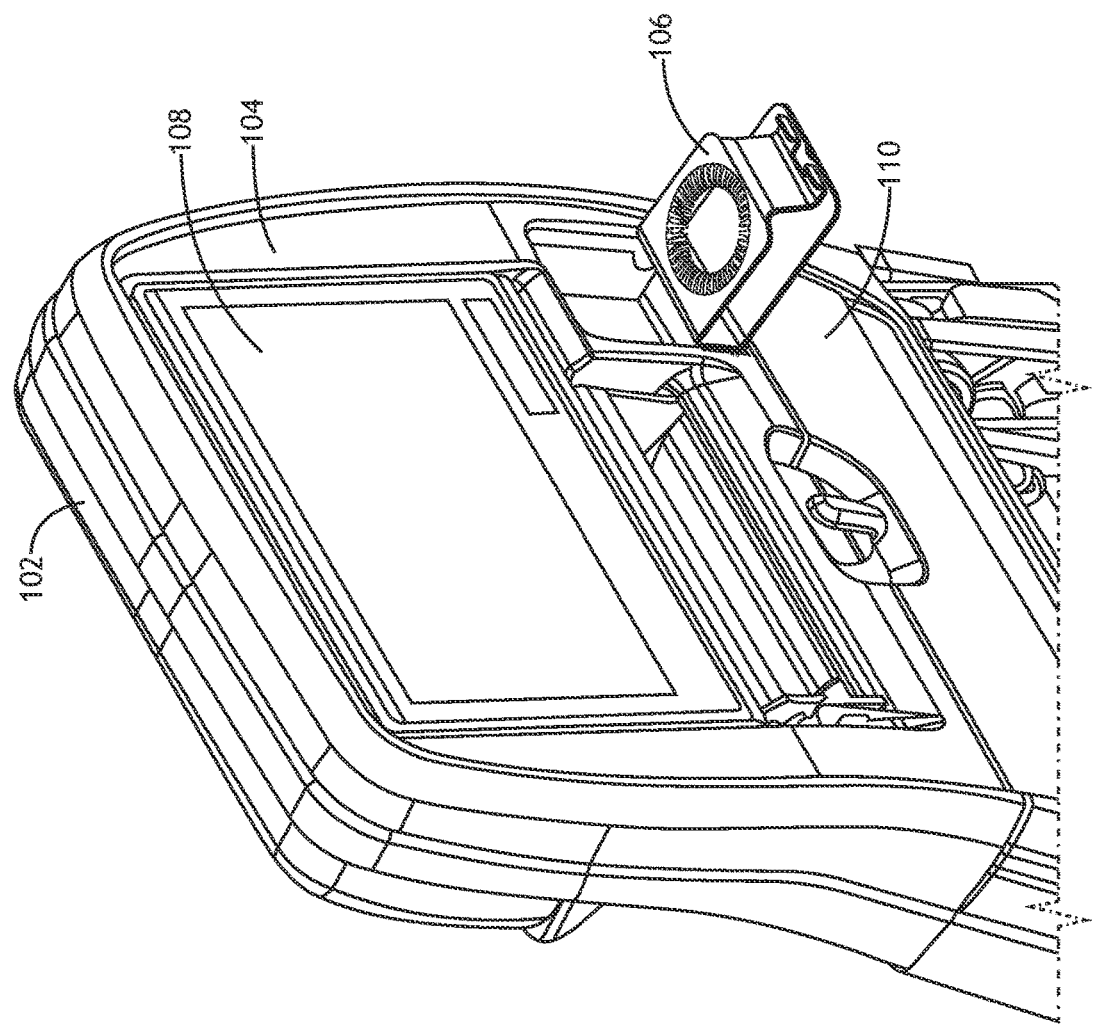
FIG. 4 is a view of an exemplary embodiment of a seat having the stowable cupholder apparatus of FIG. 1 according to the inventive concepts disclosed herein.

Referring now to FIG. 4, an exemplary embodiment of the seatback 104 including the stowable cupholder apparatus 106, with the stowable cupholder apparatus 106 in the deployed position, is shown.

Figure 5:
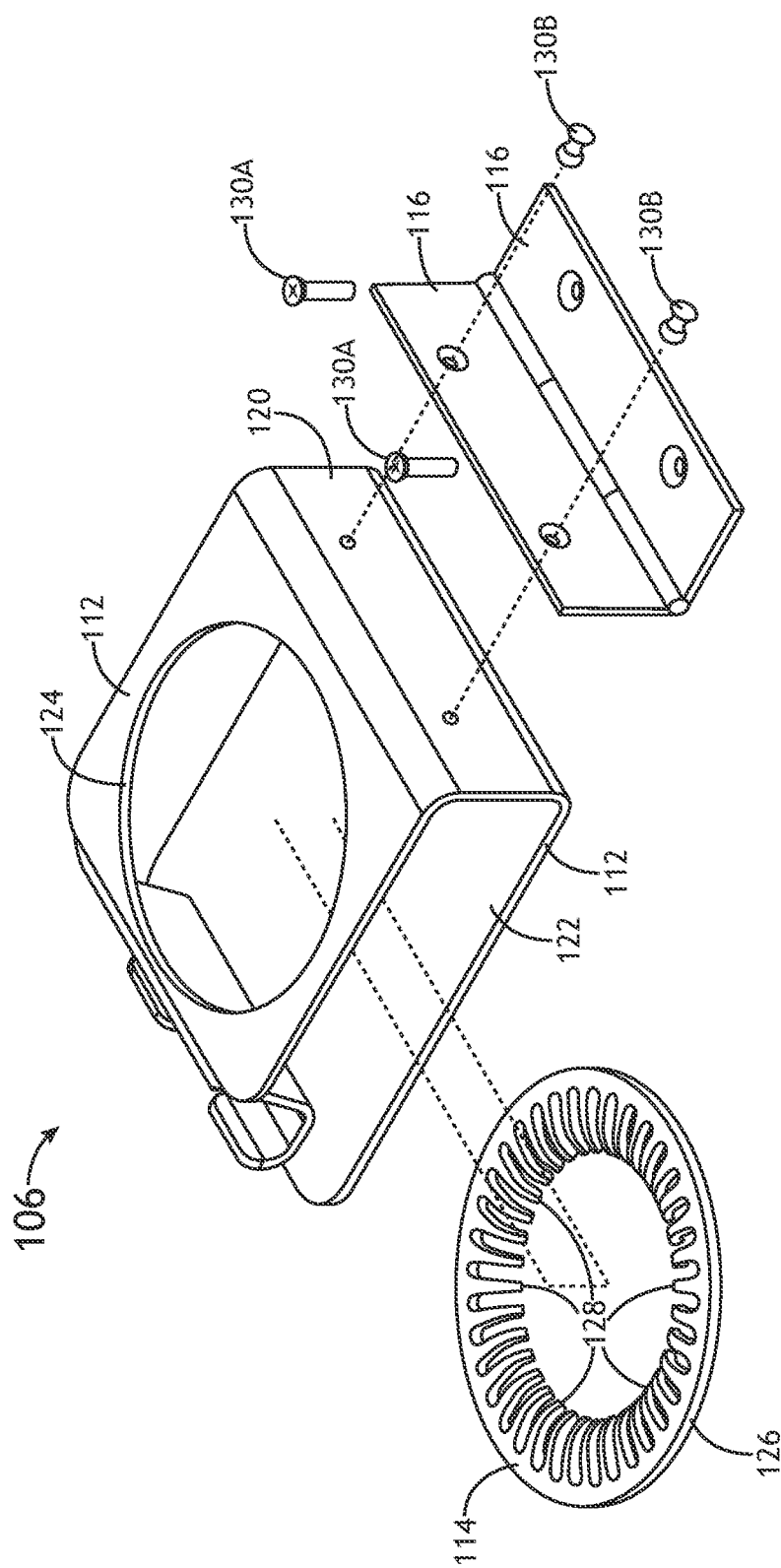
FIG. 5 is an exploded view of the stowable cupholder apparatus of FIG. 1 according to the inventive concepts disclosed herein.

Referring now to FIG. 5, an exploded view of an exemplary embodiment of the stowable cupholder apparatus 106 is shown. The stowable cupholder apparatus 106 may include the cupholder member 112, the cup grip ring member 114, and the hinge 116.

Figure 6:
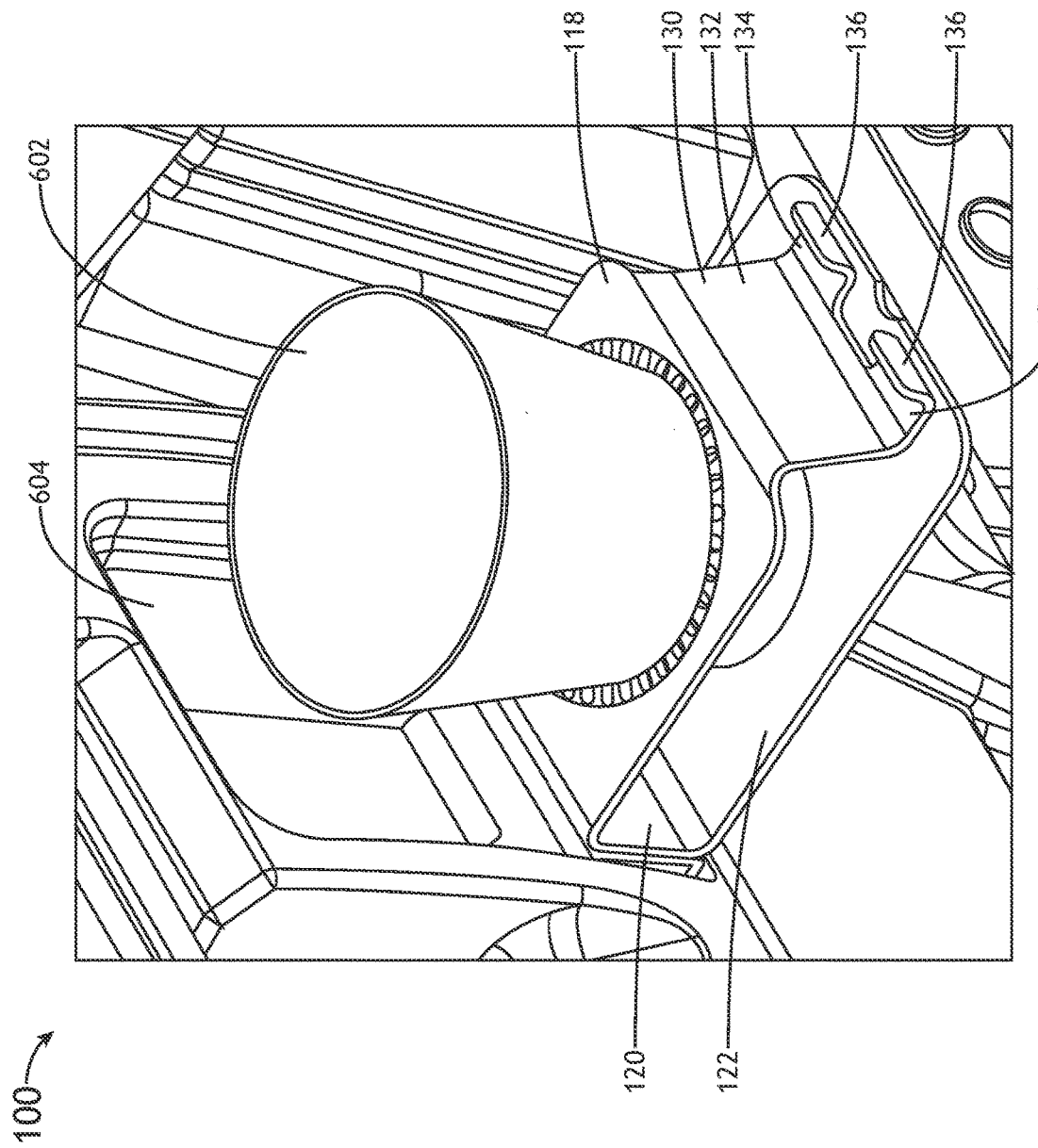
FIG. 6 is a view of an exemplary embodiment of a seat having the stowable cupholder apparatus of FIG. 1 according to the inventive concepts disclosed herein.

The cupholder member 112 may be defined by: a top planar member 118, a rear planar member 120, a base planar member 122, and/or an accessory holder member 130 (e.g., as better viewed in FIG. 6). The cupholder member 112 may be composed of any suitable material(s), such as metal, plastic (e.g., a single piece of plastic), and/or carbon fiber.

The top planar member 118 may have a cup hole 124 (e.g., a circular cup hole) configured to accommodate a drink or a cup (e.g., 602 as shown in FIG. 6). The top planar member 118 may be above and parallel to the base planar member 122, and a gap may exist between the top planar member 118 and the base planar member 122.

The rear planar member 120 may extend from the top planar member 118, such as at a right angle.

The base planar member 122 may extend from the rear planar member, such as at a right angle.

The cup grip ring member 114 may be attached to the top planar member 118. The cup grip ring member 114 may include a ring 126 and cup grip fingers 128 extending inwardly away from the ring 126. The cup grip fingers 128 may taper and/or curve downward toward tips of the cup grip fingers 128. In some embodiments, the cup grip ring member 114, the cup grip ring member 114 may be composed of any suitable material(s), such as silicone rubber.

The hinge 116 may be attached to the rear planar member (e.g., with first attachment means (e.g., rivets 130B, which may have countersunk heads)) and configured to attach to a structure (e.g., a galley monument or a seatback 104) (e.g., with a second attachment means (e.g., screws 130A, which may have countersunk heads)). In some embodiments, the hinge 116 is a piano hinge, which for example, may support multiple pounds of load (e.g., 4 or more pounds) and may have an 0-degree to 90-degree (e.g., 90-degree) range of motion. The hinge 116 may have a range of motion configured to move the cupholder member 112 between a stowed position and a deployed position.

Referring now to FIG. 6, an exemplary embodiment of the stowable cupholder apparatus 106 in a deployed position holding a cup 602 is shown.

The accessory holder member 130 the accessory holder member may extend from the top planar member 118.

The accessory holder member 130 may be defined by: a planar accessory holder 132 member extending in a direction at least toward the base planar member 122, such as toward the base planar member 122 and away from the rear planar member 120; at least one (e.g., two) ledge member 134 extending from the planar accessory holder 132 in a direction at least away from the rear planar member 120; and/or at least one (e.g., two) lip member 136, each of the at least one lip member extending from one of the at least one ledge member 134 in a direction at least away from the base planar member 122.

In some embodiments, the at least one ledge member 134 includes two ledge members 134, wherein the accessory holder member 130 is further defined by a notch between the two ledge members 134, wherein the at least one lip member 136 includes two lip members 136.

In some embodiments, each of the at least one lip member 136 extends from one of the at least one ledge member 134 in a direction perpendicular to the base planar member 122.

In some embodiments, the accessory holder member 130 acts as a mobile electronic device stand configured to prop up the mobile electronic device (e.g., 702 in FIG. 7) for a passenger to view the mobile electronic device (e.g., 702).

In some embodiments, the accessory holder member 130 acts as an apparel hook (e.g., a coat hook).

Figure 7:
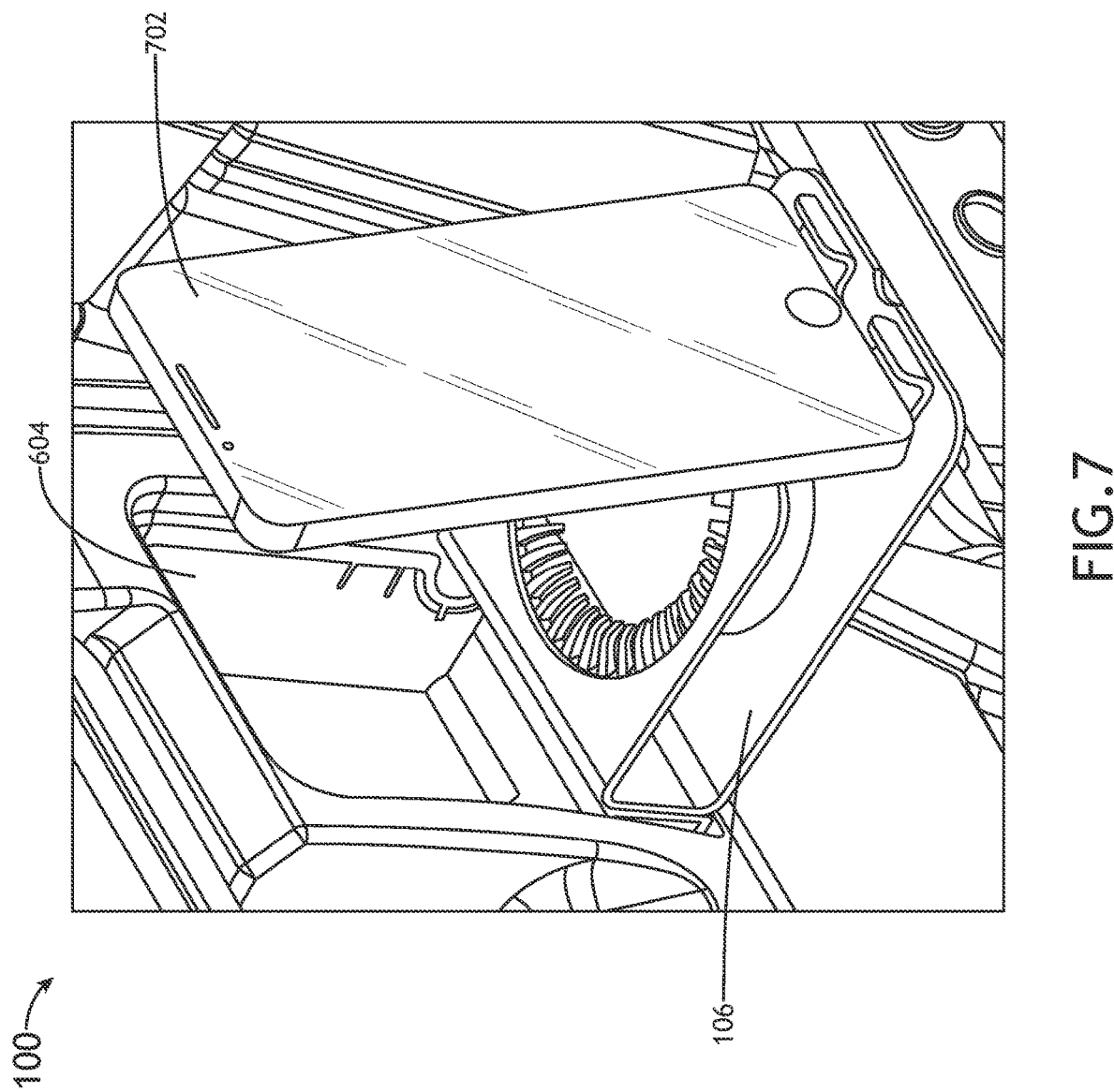
FIG. 7 is a view of an exemplary embodiment of a seat having the stowable cupholder apparatus of FIG. 1 according to the inventive concepts disclosed herein.

Referring now to FIG. 7, an exemplary embodiment of the stowable cupholder apparatus 106 holding a mobile electronic device 702 is shown.

Figure 8:
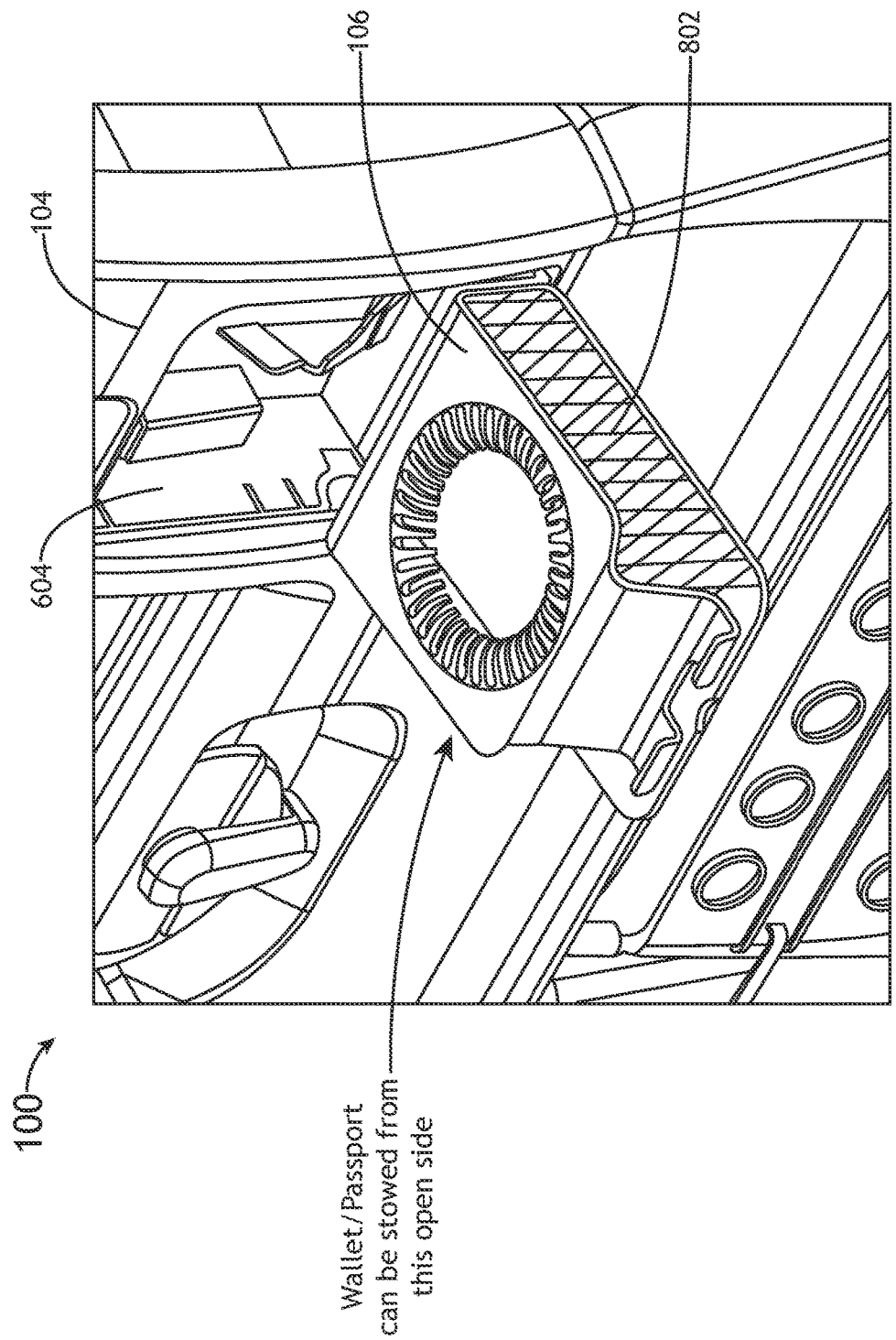
FIG. 8 is a view of an exemplary embodiment of a seat having the stowable cupholder apparatus of FIG. 1 according to the inventive concepts disclosed herein.

Referring now to FIG. 8, an exemplary embodiment of the stowable cupholder apparatus 106 in a deployed position is shown.

In some embodiments, the stowable cupholder apparatus 106 may further include mesh 802 attached to the top planar member 118 and the base planar member 122. The mesh 802 may extending between the top planar member 118 and the base planar member 122. An item storage area may be defined by a side opening, the mesh 802, the top planar member 118, the base planar member 122, the rear planar member 120, and the planar accessory holder member 130. The item storage area may be configured to hold any suitable passenger items, such as a wallet or a passport.

In some embodiments, the stowable cupholder apparatus 106 may be installed on the aircraft seatback 104 such that the stowable cupholder apparatus 106 is vertically positioned between a display 108 and a meal tray 110 when the meal tray 110 is in a stowed position. For example, the stowable cupholder apparatus 106 may be installed in a horizontally off-centered position on the aircraft seatback 104.

In some embodiments, the stowable cupholder apparatus 106 may be installed on the aircraft seatback 104 such that the stowable cupholder apparatus 106 is vertically positioned above a meal tray 110 when the meal tray 110 is in a stowed position.

In some embodiments, the stowable cupholder apparatus 106 may be installed in a horizontally off-centered position on the aircraft seatback 104.

As will be appreciated from the above, embodiments of the inventive concepts disclosed herein may be directed to a system including a stowable cupholder apparatus.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a stowable cupholder apparatus, comprising:
        a cupholder member defined by:
            a top planar member, the top planar member having a cup hole configured to accommodate a cup;
            a rear planar member extending from the top planar member; and
            a base planar member extending from the rear planar member, wherein a gap exists between the top planar member and the base planar member;
        a cup grip ring member attached to the top planar member, the cup grip ring member comprising a ring and cup grip fingers extending inwardly away from the ring, wherein the cup grip ring member is attached to the top planar member within the cup hole of the top planar member; and
        a hinge attached to the rear planar member and configured to attach to a structure, wherein the hinge has a range of motion configured to move the cupholder member between a stowed position and a deployed position.

2. The system of claim 1, wherein the cup grip ring member is composed at least of silicone rubber.

3. The system of claim 1, wherein the cupholder member is further defined by an accessory holder member extending from the top planar member, the accessory holder member defined by:
    a planar accessory holder member extending in a direction at least toward the base planar member;
    at least one ledge member extending from the planar accessory holder in a direction at least away from the rear planar member; and
    at least one lip member, each of the at least one lip member extending from one of the at least one ledge member in a direction at least away from the base planar member.

4. The system of claim 3, wherein the at least one ledge member comprises two ledge members, wherein the accessory holder member is further defined by a notch between the two ledge members, wherein the at least one lip member comprises two lip members.

5. The system of claim 3, wherein the planar accessory holder member extends toward the base planar member and away from the rear planar member.

6. The system of claim 3, wherein each of the at least one lip member extends from one of the at least one ledge member in a direction perpendicular to the base planar member.

7. The system of claim 3, wherein the stowable cupholder apparatus further comprises mesh attached to the top planar member and the base planar member, the mesh extending between the top planar member and the base planar member, wherein an item storage area is defined by a side opening, the mesh, the top planar member, the base planar member, the rear planar member, and the planar accessory holder member.

8. The system of claim 3, wherein the accessory holder member acts as a mobile electronic device stand configured to prop up the mobile electronic device for a passenger to view the mobile electronic device.

9. The system of claim 3, wherein the accessory holder member acts as an apparel hook.

10. The system of claim 1, wherein the cupholder member is composed of a single piece of metal or plastic.

11. The system of claim 1, wherein the top planar member and the base planar member are parallel.

12. The system of claim 11, wherein the rear planar member is perpendicular to the top planar member and the base planar member.

13. The system of claim 1, wherein the range of motion is an 0- to 90-degree range of motion.

14. The system of claim 13, wherein the hinge is a 90-degree piano hinge.

15. The system of claim 1, wherein the structure is a vehicle seatback.

16. The system of claim 15, further comprising an aircraft seat comprising the vehicle seatback comprising the stowable cupholder apparatus, wherein the vehicle seatback is an aircraft seatback.

17. The system of claim 16, wherein the stowable cupholder apparatus is installed on the aircraft seatback such that the stowable cupholder apparatus is vertically positioned between a display and a meal tray when the meal tray is in a stowed position.

18. The system of claim 17, wherein the stowable cupholder apparatus is installed in a horizontally off-centered position on the aircraft seatback.

19. The system of claim 15, wherein the vehicle seatback is an aircraft seatback, wherein the stowable cupholder apparatus is installed on the aircraft seatback such that the stowable cupholder apparatus is vertically positioned above a meal tray when the meal tray is in a stowed position.

20. The system of claim 15, wherein the vehicle seatback is an aircraft seatback, wherein the stowable cupholder apparatus is installed in a horizontally off-centered position on the aircraft seatback.

* * * * *